United States Patent [19]
Vick et al.

[11] Patent Number: 5,782,498
[45] Date of Patent: Jul. 21, 1998

[54] SEALING FLANGE, IN PARTICULAR FOR INTERNAL LINING OF PIPES

[75] Inventors: Steve Vick, Norton St Philip; Gordon Hewlett, Wellow, both of United Kingdom

[73] Assignee: Gaz de France, Paris, France

[21] Appl. No.: 788,797

[22] Filed: Jan. 23, 1997

Related U.S. Application Data

[63] Continuation of Ser. No. 561,528, Nov. 21, 1995, abandoned.

[30] Foreign Application Priority Data

Nov. 22, 1994 [FR] France ................ 94 13980

[51] Int. Cl.[6] ................ F16L 55/13; F16L 47/00
[52] U.S. Cl. ................ 285/3; 285/15; 285/345; 285/133.1; 285/55; 277/208
[58] Field of Search ................ 285/3, 15, 351, 285/260, 345, 55, 133.1; 277/207, 208, 207 A

[56] References Cited

U.S. PATENT DOCUMENTS

| | | | |
|---|---|---|---|
| 1,926,197 | 9/1933 | Durr | 285/345 |
| 1,933,117 | 10/1933 | Markle | 285/3 |
| 3,201,148 | 8/1965 | Shurtleef | 285/3 |
| 3,682,503 | 8/1972 | Bloom | 285/345 |
| 3,807,744 | 4/1974 | Gibling | 277/207 |
| 3,998,478 | 12/1976 | Zopei | 285/345 |
| 4,174,125 | 11/1979 | Wyss | 285/345 |
| 4,579,353 | 4/1986 | Bower | 285/345 |
| 4,664,421 | 5/1987 | Jones | 285/345 |
| 5,071,170 | 12/1991 | Panella | 285/345 |
| 5,082,313 | 1/1992 | Bryant | 285/15 |
| 5,180,197 | 1/1993 | Thompson, Jr. | 285/351 |
| 5,421,370 | 6/1995 | Marcout et al. | 138/98 |

FOREIGN PATENT DOCUMENTS

| | | | |
|---|---|---|---|
| 50258 | 9/1992 | European Pat. Off. | 285/345 |
| 8707440 | 10/1987 | Germany. | |
| 725039 | 11/1966 | Italy | 285/345 |
| 2263750 | 8/1993 | United Kingdom. | |

*Primary Examiner*—Eric K. Nicholson
*Attorney, Agent, or Firm*—Rothwell, Figg, Ernst & Kurz

[57] ABSTRACT

The invention relates to a sealing flange (14) which comprises a tubular structure which has an axis (22) and consists of an integral tubular outer body (20) which contains a series of annular seals (32a, 32b, 32c, 32d) which are disposed substantially coaxially according to the axis, these seals being suitable for surrounding a tube when the latter is inserted in the structure. The invention applies in particular to repair of gas pipes.

4 Claims, 3 Drawing Sheets

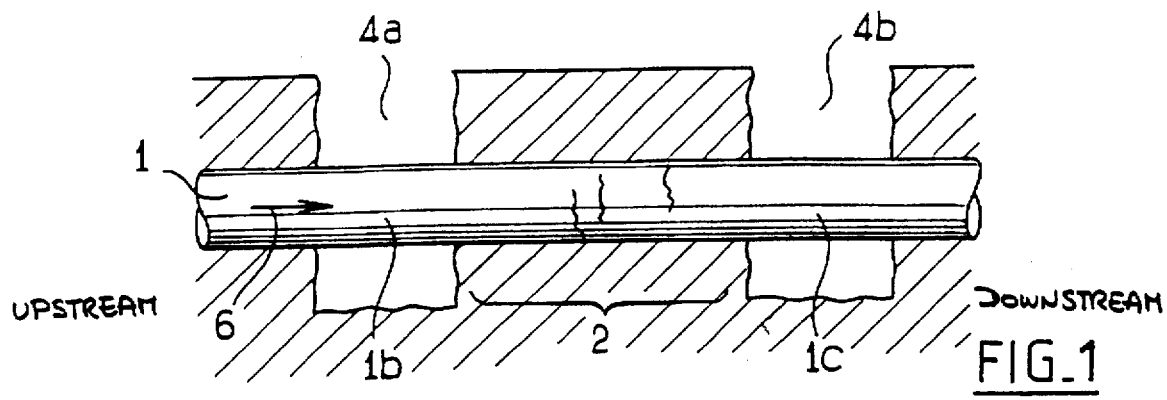
FIG_1
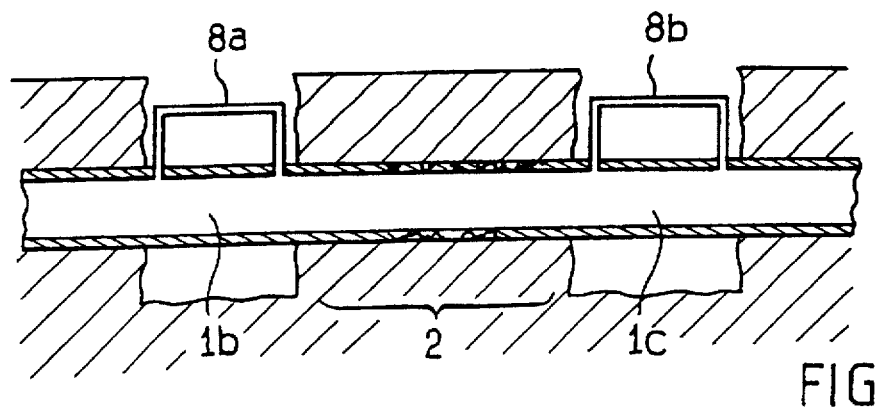
FIG_2
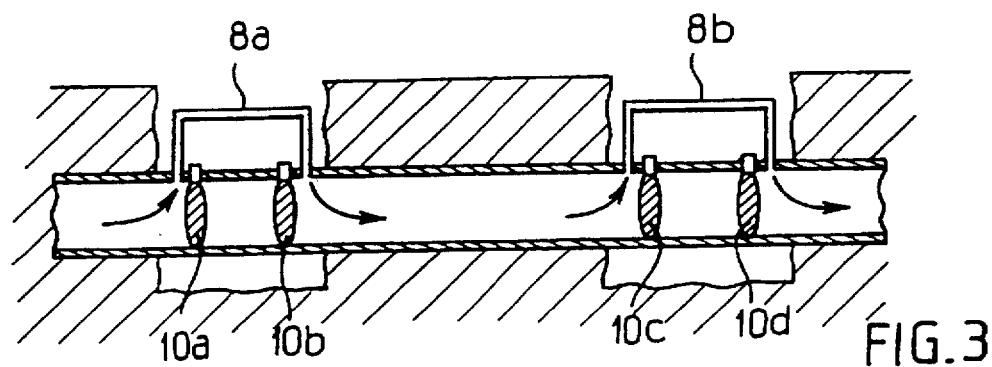
FIG_3
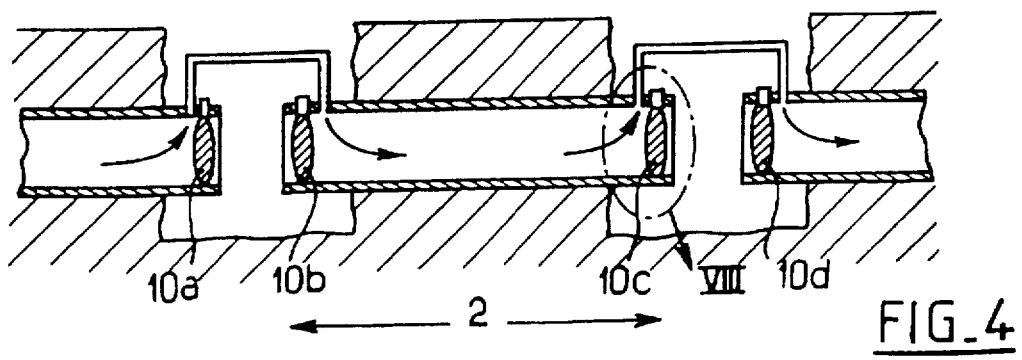
FIG_4

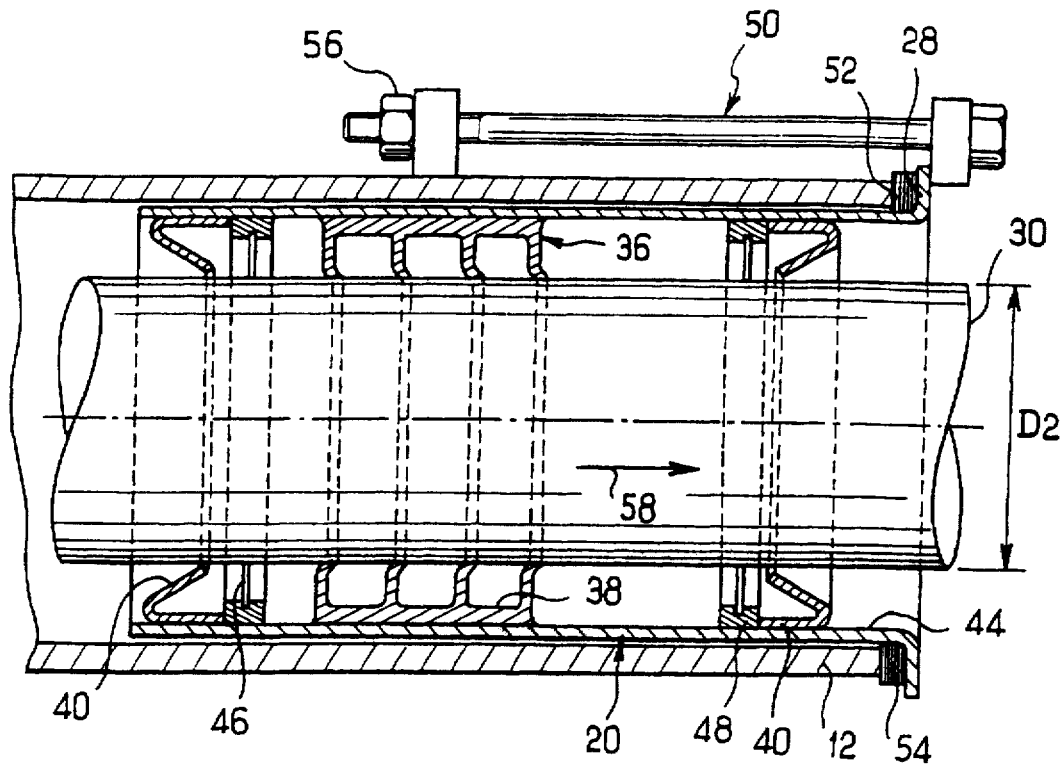
FIG_8
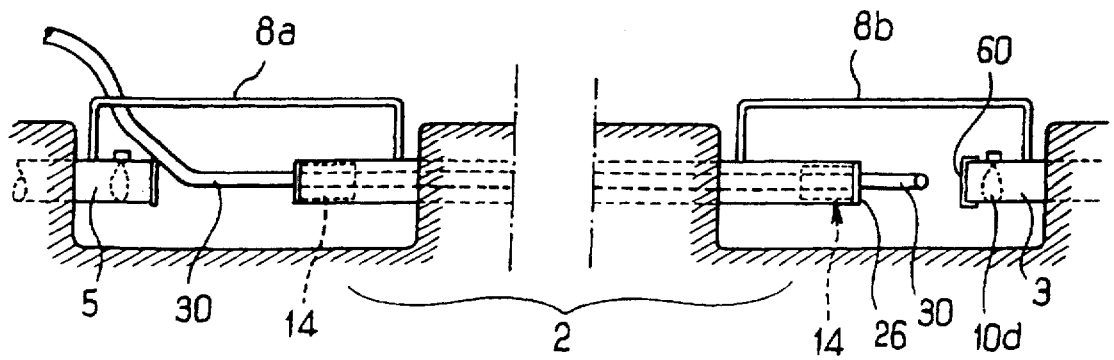
FIG_9

SEALING FLANGE, IN PARTICULAR FOR INTERNAL LINING OF PIPES

This is a continuation of application Ser. No. 08/561,528, filed Nov. 21, 1995 now abandoned.

FIELD OF THE INVENTION

The invention relates to a connection component provided on pipes and other ducts, for example for distribution of water or gas.

In particular, the invention relates to a sealing flange for sealed guiding of a relatively flexible tube, used for internal lining, particularly for existing metal pipes when they are defective, it being possible to carry out this lining in "loaded" conditions (ie. without interrupting the supply to the user).

DESCRIPTION OF RELATED ART

Means already exist for permitting internal lining of pipes.

Currently for example, when repairs need to be carried out on a cast iron duct, the common technique consists of digging two holes "upstream" and "downstream" of the defective area, in order to dig up the duct locally (hereinafter the terms "upstream" and "downstream" will be used in relation with the normal direction of flow of the fluid in the pipes). After installation of temporary by-passes and shutters, the duct is cut in the position of the two holes. The part to be lined is thus defined between the cuts, without interrupting the supplier of fluid to the users.

In the upstream hole (known as the introduction hole), a flange which is provided with a valve is fitted at the upstream end of the section to be lined. After removal of the shutters, wherever necessary, the flexible replacement duct is inserted into the cut section via the flange, using a feeder.

When the section has been lined, a polymer sealing foam is then usually injected around the lining duct, inside the end of the section from which this duct emerges, in order to fill the gap between this lining duct and the lined pipes. When the foam has set, the operator generally creates an additional foam seal in the end of the metal duct and adjacent to the first seal. The foam is then normally contained in a bag in order to form a sealed cone which reinforces the protection provided by the first seal. Since the remaining operations are quite conventional, they will not be discussed further.

Currently, there are no means for connecting and/or guiding ducts, which are very simple and economic both to produce and use, as well as permitting diversified usage (in particularly fitting of these means alternatively on one of the upstream or downstream ends of the sections to be repaired), and guaranteeing reliable sealing, taking into account in particular the generally high pressure of the fluids which flow in the pipes to be repaired.

In fact, in particular it has been found that the usual lining technique:
- is a long and delicate process to implement, ie. there are constraints of ambient temperature and setting time for use of the foam, and the flange which contains a valve is difficult to manoeuvre and has a complex structure, since it comprises a plurality of separable components which must be connected together for use, or changed according to the size of the ducts;
- requires qualified, well-trained workers;
- involves high lining costs; and
- causes long term problems of reliability of sealing.

SUMMARY OF THE INVENTION

For these reasons, the object of the invention is a sealing flange which comprises a tubular structure which has an axis and consists of a an integral tubular outer body which contains series of coaxial annular seals, these seals being suitable for surrounding a lining duct when the latter is inserted in the structure.

A structure of this type is particularly simple to produce at a low cost price, and permits improvement of the conditions of use, irrespective of the level of training of the operators.

According to a preferred embodiment, the structure comprises means for guiding and centring the lining duct, these means advantageously consisting of at least one annular unit which has a frusto-conical guiding and centring surface. Thus the flange makes it possible to facilitate operations of insertion of the tube in the pipe section to be repaired, and also to reduce the intervention times.

The flange advantageously comprises a sealing partition which forms a barrier which is sealed against the fluids inside the outer body, and can be opened by the lining duct. The operators thus have a flange which, when it closes one end of the section to be repaired and the lining pipe has not passed through its partition, provides reliable sealing even over long periods of time.

Again for the sake of rationalising production and use of the flange, the later advantageously contains two sealing partitions, between which there are disposed the seals and two annular guiding and centring units.

By this means, the flange has considerable versatility, and can in particular be fitted on the section to be repaired, alternatively on the upstream end of this section, in order to permit insertion in a sealed manner of the lining duct, or on the opposite, downstream end, in order to receive this lining duct at the outlet of the section. Two such flanges disposed at the two ends of the section to be repaired are thus sufficient for internal lining of this section, without needing to use additional systems (complex flange with valve, sealing foam).

BRIEF DESCRIPTION OF THE DRAWINGS

The invention and its use will become apparent from the following description, with reference to the attached drawings which are provided purely by way of example. In the drawings:

FIGS. 1 to 4 show schematically the first four main stages of preparation for lining of a pipe section which is defective or is to be repaired;

FIG. 8 is an enlarged longitudinal cross-section of the flange according to the invention in position at the downstream end of the isolated section according to FIG. 4 (reference VIII); and In accordance with FIGS. 1 to 4, FIG. 9 is an general view of the lining area with the defective section already lined.

DESCRIPTION OF PREFERRED EMBODIMENTS

Figure 5:
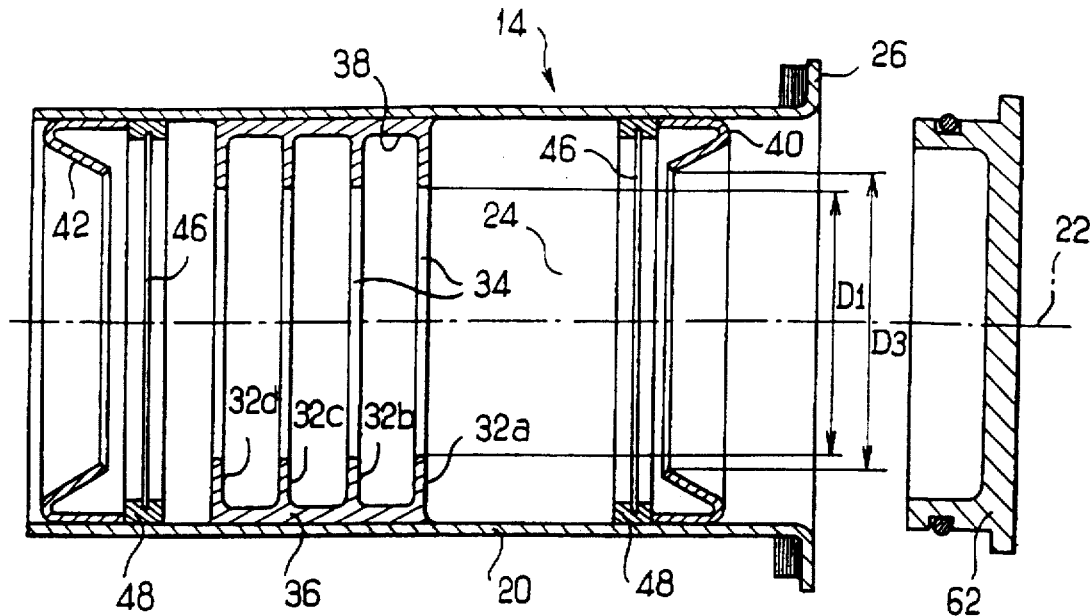
FIG. 5 is an enlarged median cross-sectional view of the flange according to the invention.

The remainder of the description will simply describe a preferred embodiment of production and use of the flange according to the invention, within the context of lining of a metal duct 1, which for example is made of cast iron, in which there flows a gas (such as natural gas), in the direction of the arrow 6.

In a specific location this duct has a section 2 which is to be repaired. At both sides of this section, two holes 4a, 4b are dug in order to reveal two portions of duct 1b and 1c, which are located respectively upstream and downstream of section 2.

Two by-pass ducts 8a, 8b of a suitable length (FIG. 2) are then connected in the position of the two portions 1b and 1c which have been revealed.

When this operation has been carried out, sealed isolation means, such as four inflatable balloons 10a, 10b, 10c, 10d inserted in the duct via four transverse apertures, are put into position in order to force circulation of the gas into the by-passes (FIG. 3). All of this is known, and FR 2663104 for example describes means suitable for these operations.

The section 2 to be repaired is then isolated, and the duct is cut in the position of the two holes, between the above-described sealed isolation means (FIG. 4). When these two discontinuities have been implemented, the actual lining operations commence.

Figure 6:
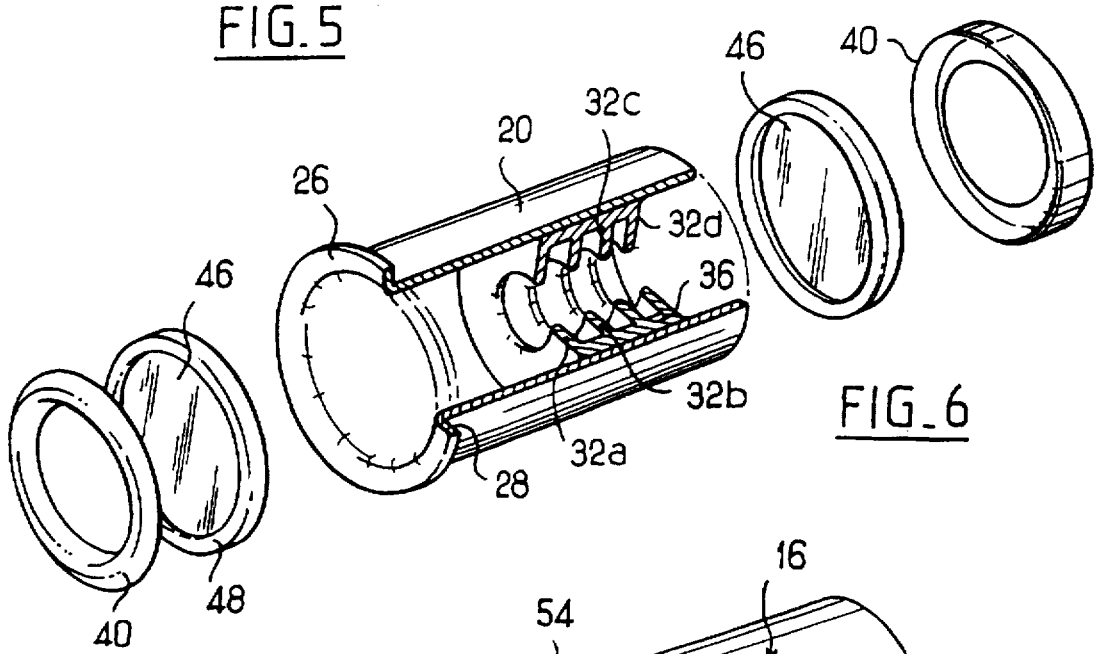
FIG. 6 is an exploded perspective view of the flange in FIG. 5.
Figure 7:
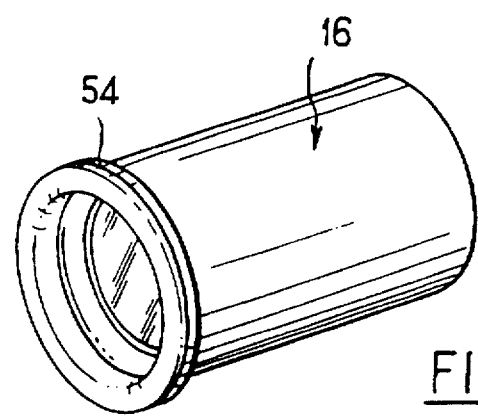
FIG. 7 is a perspective view of the same flange with its components connected.

According to the invention, at one and/or the other of the upstream and downstream ends of the section 2, there is then installed a sealing flange, illustrated in FIGS. 5 to 8, which is left on the lining duct when the lining is completed.

In the version illustrated, the flange 14 according to the invention consists substantially of a connection and sealed guiding part 16, which in this case comprises a plurality of components connected to one another definitively. Means 50 and 54 for sealed attachment of the structure 16 to the duct 1 are also provided.

The structure 16 comprises a single-piece outer body 20 which has an axis 22 and an axial inner passage 24, to which the other components of the structure are closely connected. This cylindrical integral body 20, which has a substantially circular outer cross-section with a diameter close to the inner diameter of the support duct 2, ends on one side in a projection towards the exterior which forms an annular collar 26 which abuts the seal 28.

Since the flange is specifically provided in order to ensure longitudinal guiding, sealed against fluids, of a flexible lining duct 30 (Which for example is made of polyethylene), it comprises a plurality of seals, and in this case four, 32a, 32b, 32c and 32d. These disc-shaped seals, in each of which there is a central aperture 34, are disposed inside the outer body 20, one after the other coaxially according to the axis 22. The common diameter D1 of the central aperture 34 is the same as, or slightly smaller than the outer diameter D2 of the duct 30.

The seals 32 are preferably integral with a hollow cylindrical body 36, which projects from the inner tubular surface 38 of the body 36. This integral inner body 36 has a substantially circular outer cross-section, with an outer diameter which is the same as, or slightly smaller than the inner diameter of the body 20, in order to be inserted in the latter, and its own inner diameter is much larger than the diameter D2. The connection between these bodies 20 and 36 can consist of any known sealed connection means, such as a suitable adhesive.

The structure 16 also comprises means for guiding and centring the lining duct 30. These means comprise at least one annular unit 40, disposed inside the body 20. This annular unit is coaxial to the body 20, and has a frusto-conical guiding and centring surface which is also coaxial to the body.

This unit 40 can consist of a relatively rigid plastics material, such as polyvinyl chloride (PVC), like the outer body 20 to which it is closely attached (in a sealed manner), for example by being glued to its inner surface 44 (any equivalent sealed attachment means is also suitable). As a variant, the unit 40 and the body 20 can be integral.

Advantageously, two units 40 are provided, each at one free end of the body 20, their surface 42 being tapered towards the interior of the body 20 and having a small diameter D3 which is the same as, or slightly larger than the diameter D2 of the tube 30. Thus, the duct 30 is substantially guided by these annular units in its axial translation movement in both directions, the aforementioned seals also participating in this guiding.

The structure 16 additionally comprises at least one sealing partition 46 which is disposed inside the body 20, substantially perpendicularly to the axis 22. This partition must be located after the seals, relative to the direction of displacement planned for the duct 30 in the flange, in order to guarantee full sealing for as long as the duct 30 is not in contact with the sealing discs. This partition forms a barrier which is sealed against fluids inside the body 20, and can be opened by the duct 30. It consists of a disc-shaped, relatively thin, tearable plastic membrane or film, the circumference of which is sealed in a retention ring 48. This ring is closely connected to the wall 44 of the body 20, for example by being glued.

Preferably, in order for the flange to be suitable for axial displacement in both directions through it of the duct 30, it comprises two partitions disposed on both sides of the seals.

The flange 14 can also consist of a stopper 62 which closes hermetically the end of the body 20 on the side of its collar 26, in order to improve further the sealing of the system when the flange is fitted on the section 2, and the duct 30 has not yet been inserted.

In FIG. 8, the flange 14 is shown disposed substantially coaxially to the section 2, at its downstream end 12. For connection of the parts 12 and 16, a clamping collar 50 or any equivalent means can be used, which is attached in a removable matter to the section 2, and presses (by tightening the bolts 56) the collar 26 of the flange against the end joining surface 52 of the section 2. For sealing of the connection, an O-ring seal 54 is disposed around the body 20 and abuts the sealing plane 28, in order to be compressed between the collar 26 and the surface 52 when the collar is clamped. This collar is separable from the structure 16.

The outer diameter of the body 20 is advantageously slightly smaller than the inner diameter of the section 2, such that it can be inserted in the latter without any significant radial play, with the edge 26 alone extending beyond the end of the section. According to a variant, the flange can also be disposed in the extension of the section 2. It will be appreciated that the inner diameter of the body 20 must be larger than the outer diameter of the duct 30, for passage of the latter.

Since the diameters of the lining ducts and pipes to be repaired are standardised, production of the flanges can be standardised according to the size of the two pipes to be connected.

Since in this case the flange is at the downstream end of the section, it receives the duct 30 in order to guide it outside the section. In its displacement (according to the arrow 58), the duct 30 is firstly guided by the upstream frusto-conical surface 42, then tears the first upstream membrane it encounters. As long as the duct 30 is not in contact with the discs 32a to 32d, gas enters the body 20, but sealing is provided by the second downstream membrane. The duct 30 then passes through the seals 32 in a sealed manner, each of these discs, which are made of a flexible material (such as rubber) being deformed resiliently in order to form a type of central cone around the duct, thus further assisting sealing around the latter. After passing through the sealing discs, the duct then tears the second membrane in order to emerge from the section 2, sealing being provided by the annular seals.

FIG. 9 shows the area of intervention at this moment, when the downstream end of the flexible duct 30 extends beyond the flange. All that remains is to withdraw the insulating closing plate which up to this point has been blocking the entry of the section 3, then to connect the duct 30 to this section and deflate the sealing balloon 10d.

Since these last stages of insertion of the two opposite ends of the tube 30, respectively in the intact downstream 3 and upstream 5 pipe parts are not within the scope of the invention, they are not described in greater detail. It should simply be noted that at the end of the operation, sealed insertion of the tube 30 is such that the gas obtained from the pipe 5 circulates inside the tube 30 as far as duct 3, the by-passes 8a, 8b no longer play any part, and can thus be withdrawn, as can the sealing balloons which are still in position.

At this stage, before refilling the holes, the operator retrieves the clamping collar 50, by separating it from the components 2 and 14. This flange 14, which cannot be removed, remains around the pipe 30.

It will be appreciated that the invention is in no way limited to the above-described embodiment. Thus, as a variant, the bodies 20 and 36 which are substantially coaxial, and the annular units 40, can be integral therebetween (single-piece especially), the membranes 46 then being added subsequently.

Other embodiments are within the scope of the following claims.

We claim:

1. A pipe assembly comprising:

an outer pipe to be lined, said outer pipe having an open end and an axis;

a generally tubular sealing flange disposed in coaxial relationship with the open end of said outer pipe, said sealing flange having an end abutting the open end of said outer pipe; and an inner, liner pipe for circulating a fluid therein, said inner, liner pipe extending through said sealing flange and said outer pipe and being disposed in generally coaxial relationship with said outer pipe;

wherein said sealing flange comprises a generally tubular body;

a series of annular seals disposed generally coaxially within said body and peripherally fixed to said body, said annular seals surrounding and making sealing contact with said inner, liner pipe;

at least one sealing partition fixed generally coaxially within said body, said sealing partition having formed a barrier seal against said fluid before having been torn by said inner, liner pipe being extended through said body; and at least one annular, frustro-conical guiding and centering means disposed generally coaxially within said body, said guiding and centering means centering said inner, liner pipe within said outer pipe.

2. The assembly of claim 1, further comprising a ring-seal disposed between the open end of said outer pipe and said end of the sealing flange abutting the open end of said outer pipe.

3. The assembly of claim 1, further comprising external clamping means removably attached to said outer pipe and to said sealing flange to clamp said sealing flange to said outer pipe.

4. The assembly of claim 1, wherein said annular, frustro-conical guiding and centering means comprises a rigid plastic material and said series of annular seals comprise a flexible material.

* * * * *